Patented May 13, 1930

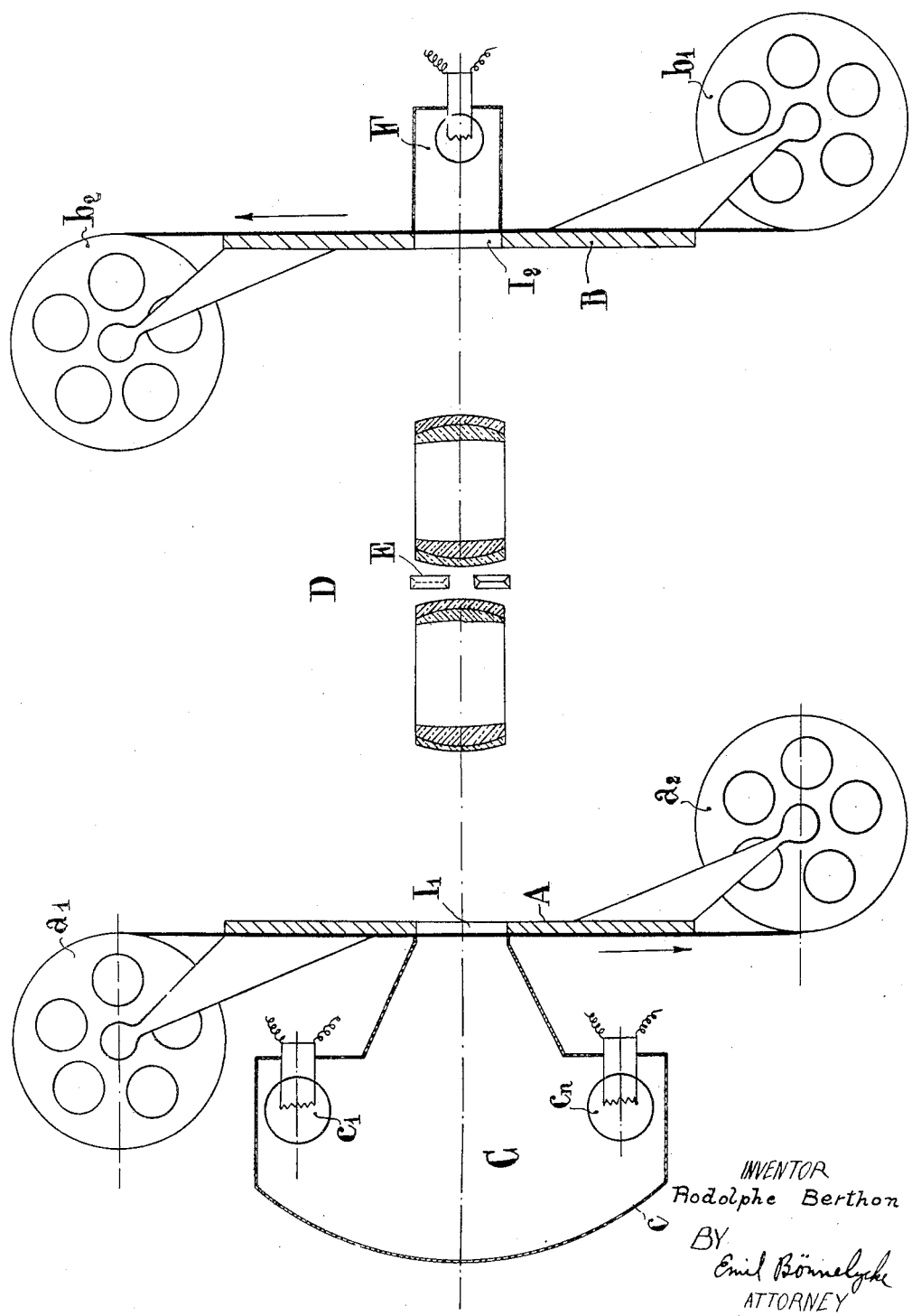

1,758,137

UNITED STATES PATENT OFFICE

RODOLPHE BERTHON, OF NEUILLY, FRANCE, ASSIGNOR, BY MESNE ASSIGNMENTS, TO SOCIÉTÉ FRANCAISE CINECHROMATIQUE (PROCEDES R. BERTHON), OF PARIS, FRANCE, A CORPORATION OF FRANCE

APPARATUS FOR PRINTING RETICULATED FILMS

Application filed July 14, 1927, Serial No. 205,736, and in France July 26, 1926.

Films with refractive microscopic elements used for copying in colours by projection may like ordinary black and while films, be used either for printing positives from negatives or for printing counter-types similar to the original pictures if the latter were obtained through inversion.

Whatever the process adopted, new prints are obtained by projecting an image bearing reticulated film on a blank reticulated film. Producing positives from negatives is governed above all by the use of films with optically faultless lenticular elements. Producing inverted counter-types does not require so nice an accuracy, the optical defects of both films being, in principle, neutralized by the inverting operation (or transformation of the negative into a positive).

The apparatus which is the object of this invention is particularly designed for obtaining countertypes on reticulated films, but may also be usefully employed for printing positives from negatives, or even simply for printing black and white countertypes.

The apparatus is diagrammatically illustrated as an example, in the drawing appended hereto, a vertical section thereof through the optical axis of the system being shown.

In the said drawing:

A represents a film-feed device in which the film is fed from a spool-box $a'$ to a spool-box $a^2$, the gate being indicated at $I^1$.

B represents another such device in which the film is fed from a spool-box $b'$ to a spool-box $b^2$, the gate being indicated at $I^2$.

C is a diffuser lantern, the back $c$ of which is vividly illuminated by a row of lamps $c^1$-$c^n$, and diffuses light in all directions on the gate $I^1$ of the film-feeding device A.

D is an optical projecting system which may be constituted by one or more lenses but characterized by the two circumstances that its aperture must afford passage to a pencil of light the angle of which is at least equal to the angle of aperture of the picture-taking camera, and that none of the rays received is intercepted in its path before reaching the blank film at gate $I^2$.

E represents an optical device intended to neutralize optically the network of the film fed past gate $I^1$. It may, as shown, be a system of small-angled prisms. As will be understood, this optical device is intended to shift the light beam in the manner described in my prior application No. 122,989, filed July 16, 1926, and thereby neutralize the net of the original film so as to remove waterings.

F is a compensator lamp intended to produce a certain dimness or fog on the rear face of the blank film. In the course of the inverting operation, this dimness or fog, decreases the absolute intensity of the image and, consequently its hardness. The intensity of the light emitted by this lamp is regulated according to the opacity of the film to be printed, and said lamp may be replaced by any device which will uniformly fog the blank film on the gelatino-bromide side.

The apparatus is operated as follows:

The film to be projected is placed in the spool-box $a'$, the end of the strip being threaded through the apparatus and wound slightly inside spool-box $a^2$; the film now being ready to be fed by means of any suitable mechanism (not shown), for example, one of the feeding mechanisms now in use in film-printing apparatus. The blank film spool is placed in spool-box $b^1$, and, as with the film to be reproduced, the end of the blank strip is threaded through the apparatus so as to start its winding within the spool-box $b^2$. Of course, the same mechanism feeds both films.

The lamps $c^1$, $c^n$ are now lit and one of the images of the film to be printed is projected through the objective D on the portion of the blank film visible at gate $I^2$. Focussing is then proceeded with and the hardness of the image thus projected is observed, the intensity of the light from the lamp F being accordingly adjusted. The greater the hardness of the projected image, the more powerful the illumination from lamp F must be. The apparatus is now operated for printing.

The diffuser lantern C requires no centering; it is sufficient to adjust the intensity of illumination to print in the best possible conditions.

Subject to fulfilling the above explained requirements as to aperture, the projection optical system D requires no other adjustment than fine focussing of the image at $I^1$ on the blank film at $I^2$.

As to the optical system E for neutralizing the network of film $I^1$, it is adjusted once for all, the adjustment being complete as soon as all trace of watering has disappeared when the film $I^1$ is projected on the film at $I^2$.

The connected lamp F is adjusted simply by means of a rheostat; and causes clear and bright prints to be obtained from films that would otherwise yield dull images. This lamp yields the same results as if positive films were available, the sensitized layer of which had previously been adjusted to the density of the images to be printed.

I claim as my invention:

1. Apparatus for reproducing photographic films which are provided with nets of microscopic refractive elements for projection in colors, such apparatus comprising separate feeding devices for the original film to be reproduced and for a blank film; a source of light behind the original film; optical devices between the two feeding devices for projecting the images of the original film upon the blank film; a device associated with the aforesaid optical devices for shifting the luminous beam so as to neutralize the net of said original film and thereby remove waterings; and a compensating source of light behind the blank film for fogging the images in order to decrease their hardness after inversion.

2. In apparatus for printing photographic films which are provided with nets of microscopic refractive elements for projection in colors, a feeding device for a blank film having a gate past which the film travels; and a compensating lamp arranged behind the feeding device in line with said gate for producing a fog or mist on the gelatino-bromide side of the film.

In testimony whereof I affix my signature.

RODOLPHE BERTHON.